United States Patent

Tamura et al.

[11] Patent Number: 6,016,259
[45] Date of Patent: Jan. 18, 2000

[54] POWER SUPPLY CIRCUIT

[75] Inventors: Hideki Tamura, Moriyama; Hideaki Abe, Neyagawa, both of Japan

[73] Assignee: Matsushita Electric Works, Ltd., Osaka, Japan

[21] Appl. No.: 08/998,247

[22] Filed: Dec. 24, 1997

[30] Foreign Application Priority Data

Dec. 24, 1996 [JP] Japan .................................. 8-342827

[51] Int. Cl.[7] .......................... H02M 3/335; H02M 2/537
[52] U.S. Cl. .............................. 363/20; 363/21; 363/131; 363/16
[58] Field of Search ................................. 363/20, 21, 19, 363/18, 131, 97

[56] References Cited

U.S. PATENT DOCUMENTS 4,510,562  4/1985  Maeba ........................................ 363/19
5,225,972  7/1993  Sakamoto .

FOREIGN PATENT DOCUMENTS

0690555A2  3/1996  European Pat. Off. .
4-295284  10/1992  Japan .
6-70461   3/1994  Japan .

Primary Examiner—Peter S. Wong
Assistant Examiner—Rajnikant B. Patel
Attorney, Agent, or Firm—Muramatsu & Associates

[57] ABSTRACT

A power supply circuit includes a switching element provided with a control terminal for changing between an ON state and an OFF state, and an LC resonant circuit connected to the switching element and has a predetermined resonant frequency. A resistor connects to the control terminal of the switching element, and a feedback winding applies a feedback voltage derived from a high frequency signal across the LC resonant circuit to the control terminal through the resistor. A bias circuit connected to the feedback winding provides a bias voltage superimposed with the feedback voltage to the control terminal through the feedback winding and the resistor for alternately switching between the ON and Off states. The feedback voltage is delayed by a time defined by the resistor before being applied to the control terminal of the switching element.

11 Claims, 9 Drawing Sheets

POWER SUPPLY CIRCUIT

FIELD OF THE INVENTION

This invention relates to a power supply circuit for supplying electric power to an electric device such as a battery, and more particularly, to a power supply circuit having an inverter circuit with improved efficiency and reliability, and reduced switching loss in the switching element of the inverter circuit.

BACKGROUND OF THE INVENTION

Figure 8:
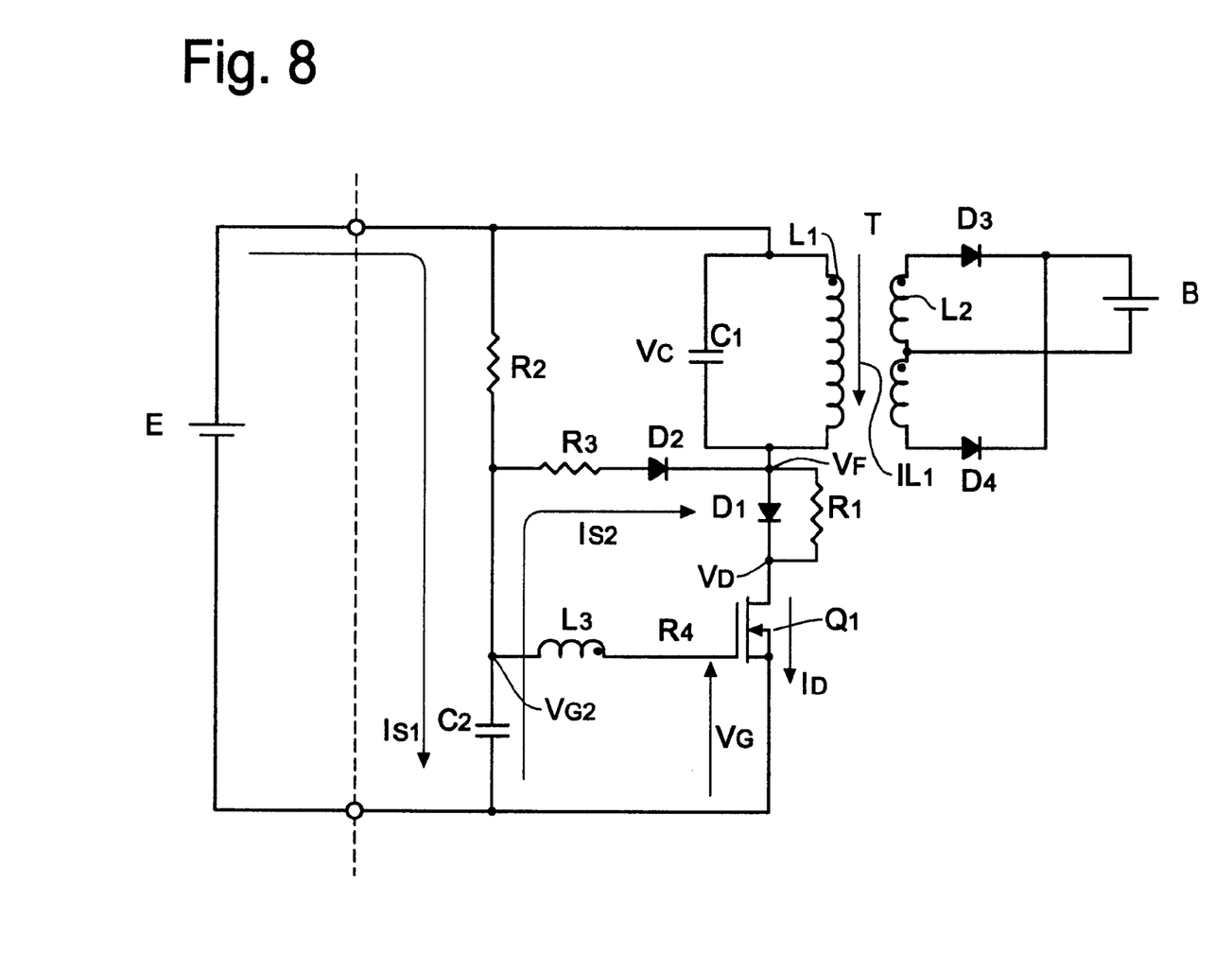
FIG. 8 is a circuit diagram showing a conventional power supply circuit.

An example of a conventional power supply circuit having an inverter circuit for charging a battery is described in U.S. Pat. No. 5,333,104. FIG. 8 is a circuit diagram showing the circuit configuration of this conventional technology. In FIG. 8, the inverter circuit is configured as follows:

An LC resonance circuit having a resonance capacitor $C_1$ and a primary winding $L_1$ connected in parallel, a parallel circuit formed of a diode $D_1$ and a resistor $R_1$, and a field effect transistor (FET) $Q_1$ which is a voltage driven type switching element FET, are connected to form a series circuit. This series circuit is connected to a direct current (DC) voltage source E. Another series circuit formed with a resistor $R_2$ and a capacitor $C_2$ is also connected to the DC voltage source E. A feedback winding $L_3$ connects to a connection point between the resistor $R_2$ and the capacitor $C_2$ and a gate of the FET $Q_1$. The feedback winding $L_3$ magnetically couples with the primary winding $L_1$ forming an oscillation transformer T. Further, the connection point of the resistor $R_2$, the capacitor $C_2$ and the primary winding $L_1$ is connected to another connection point of the primary winding $L_1$ and the diode $D_1$ through a series circuit formed of a resistor $R_3$ and a diode $D_2$. The resistors $R_2$ and $R_3$, the capacitor $C_2$, and the diode $D_2$ function as an oscillation drive circuit, a bias circuit, as well as a bias control circuit for achieving an oscillation of the inverter circuit with high stability.

A secondary winding $L_2$ of the transformer T has a center tap and magnetically connects to the primary winding $L_1$ to generate a secondary output signal. Both terminals of the secondary winding $L_2$ connects to a positive pole of a battery B to be charge through diodes $D_3$ and $D_4$. The center tap of the secondary winding $L_2$ connects to a negative pole of the battery B. By this arrangement of the inverter circuit, the secondary output signal charges the battery B.

In operation, when supplying the DC voltage E to the inverter circuit, the capacitor $C_2$ is charged by a current $I_{S1}$ flowing through the resistor $R_2$. As a result, the voltage across the capacitor $C_2$ increases and reaches a threshold voltage of the FET $Q_1$. Then, the FET $Q_1$ becomes active and goes to ON which causes a current $IL_1$ of FIG. 9B to flow through the primary winding $L_1$. The current $IL_1$ through the primary winding $L_3$ induces a voltage across the feedback winding $L_3$ which establishes a positive feedback to initiate an oscillation in the inverter circuit.

During the period when the voltage of the capacitor $C_2$ is lower than a drain voltage $V_D$ of the FET $Q_1$, the charge in the capacitor $C_2$ will be discharged by a discharge current $I_{S2}$ of FIG. 8 flowing through a loop formed of the resistor $R_3$, the diode $D_2$, the parallel circuit of the resistor $R_1$ and the diode $D_1$, the FET $Q_1$, and the capacitor $C_2$. Because of this discharge, the voltage of the capacitor $C_2$ decreases below the threshold voltage of the FET $Q_1$, which shortens the ON period of the FET $Q_1$. However, the current $I_{S2}$ discharging the capacitor $C_2$ decreases because of the shortened period of the ON state of the FET $Q_1$, which increases the voltage of the capacitor $C_2$. This negative feedback relationship stabilizes a bias voltage $V_{G2}$ (the voltage of the capacitor $C_2$) as shown in FIG. 9G, resulting a highly stabilized self-induced oscillation in the inverter circuit.

Figures 9A, 9B, 9C:
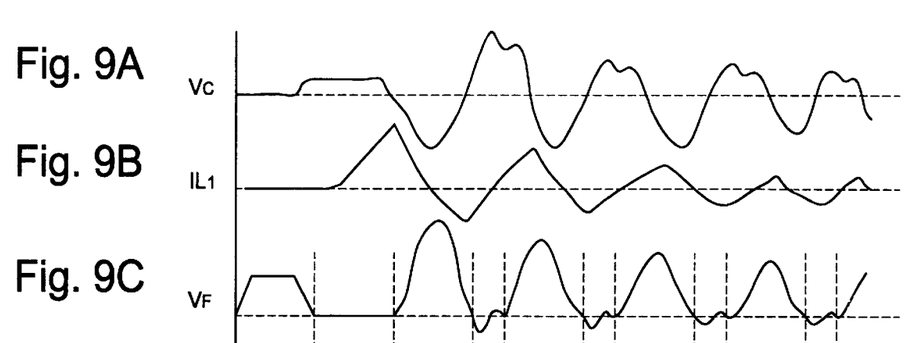
FIGS. 9A–9G are waveform diagrams showing an operation of the conventional power supply circuit of FIG. 8.

FIG. 9A is a waveform diagram showing a voltage $V_C$ across the resonance capacitor $C_1$ and FIG. 9B is a waveform diagram showing the current $IL_1$ flowing through the primary winding $L_1$. FIG. 9C shows a voltage $V_F$ at the connection point of the diode $D_1$ and the LC resonant circuit formed of the capacitor $C_1$ and the primary winding $L_1$. The diode $D_1$ inhibits a reverse current flowing through stray diodes of the FET $Q_1$.

Figure 9D:
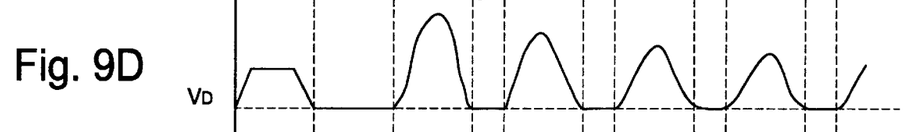
Figure 9E:
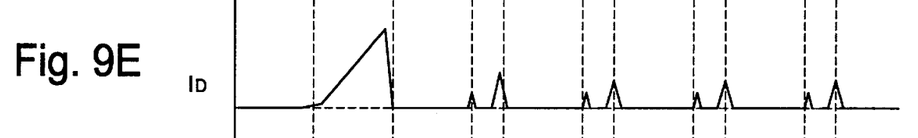
Figure 9F:
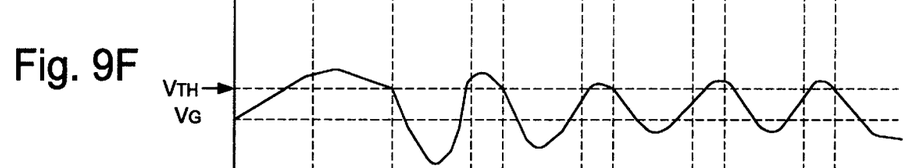
Figure 9G:
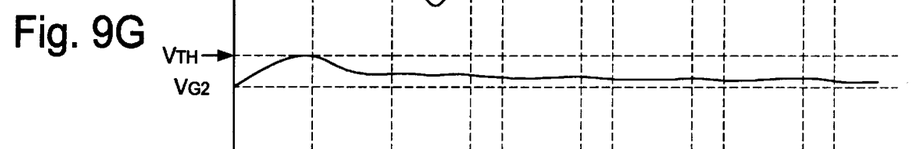

In the conventional example of FIG. 8, at the gate of the FET $Q_1$, a sinusoidal voltage $V_G$ is induced by the feedback winding $L_3$ as shown in FIG. 9F. The peak of the voltage $V_G$ is in the range of the threshold voltage $V_{TH}$ of the FET $Q_1$. A drain current $I_D$ of FIG. 9E starts flowing through the FET $Q_1$ even before the drain voltage $V_D$ of FIG. 9D reaches zero volt. Further, the drain current $I_D$ does not reach a zero level even when the drain voltage $V_D$ departs from the zero volt. Because of this drain current $I_D$, switching loss results in the FET $Q_1$.

SUMMARY OF THE INVENTION

Therefore, it is an object of the present invention to provide a power supply circuit having an inverter circuit which is capable of minimizing switching loss in a switch element of the inverter circuit.

It is another object of the present invention to provide a power supply circuit having an inverter circuit of high efficiency and reliability.

In one aspect of the present invention, a power supply circuit includes a switching element provided with a control terminal for changing between an ON state and an OFF state, an LC resonant circuit connected to the switching element and has a predetermined resonant frequency, a resistor connected to the control terminal of the switching element, a feedback winding for applying a feedback voltage derived from a high frequency signal across the LC resonant circuit to the control terminal through the resistor, and a bias circuit connected to the feedback winding for providing a bias voltage superimposed with the feedback voltage to the control terminal through the feedback winding and the resistor for alternately switching between the ON and OFF states. The feedback voltage is delayed by a time defined by the resistor before being applied to the control terminal of the switching element.

According to the first embodiment of the present invention, the feedback voltage supplied to the control terminal is delayed when it is applied to the switching element because of the resistor connected to the control terminal. Thus, a current flowing through the switching element is also delayed, which serves to decrease switching loss in the switching element.

In another aspect of the present invention, in addition to the arrangement of the first embodiment, a diode is provided in parallel with the resistor at the control terminal of the switching element. According to this aspect of the present invention, since the diode limits the amplitude of the feedback voltage applied to the control terminal, the feedback voltage quickly decreases below the threshold level of the switching element. Therefore, the current in the switching element immediately decreases, which further serves to decrease the switching loss.

In a further aspect of the present invention, in addition to the arrangement of the first embodiment, the power supply circuit includes a transistor whose base bias voltage is controlled by a current flowing through the switching element. The collector of the transistor is connected to the control terminal in such a way to decrease the bias voltage at the control terminal of the switching element. According to this embodiment, when the current in the switching element increases to a degree to make the transistor ON, the bias voltage for the control terminal decreases. Therefore, the transistor limits the current flowing through the switching element in the ON state, which serves to decrease the switching loss.

In a further aspect of the present invention, in addition to the arrangement of the first embodiment, the power supply circuit includes a transistor and a capacitor. The base bias voltage of the transistor is controlled by a current flowing through the switching element. The collector of the transistor is connected to the control terminal in such a way to decrease a bias voltage at the control terminal of the switching element. The capacitor is connected to the base of the transistor. According to this embodiment, the transistor is delayed its transition to change from the ON state to the OFF state by the capacitor connected to the base. Thus, the transition of the switching element changing from the ON state to the OFF state is achieved at high speed in response to the change of said feedback voltage, which serves to decrease the switching loss.

DETAILED DESCRIPTION OF THE PREFERRED EMBODIMENTS

Figure 1:
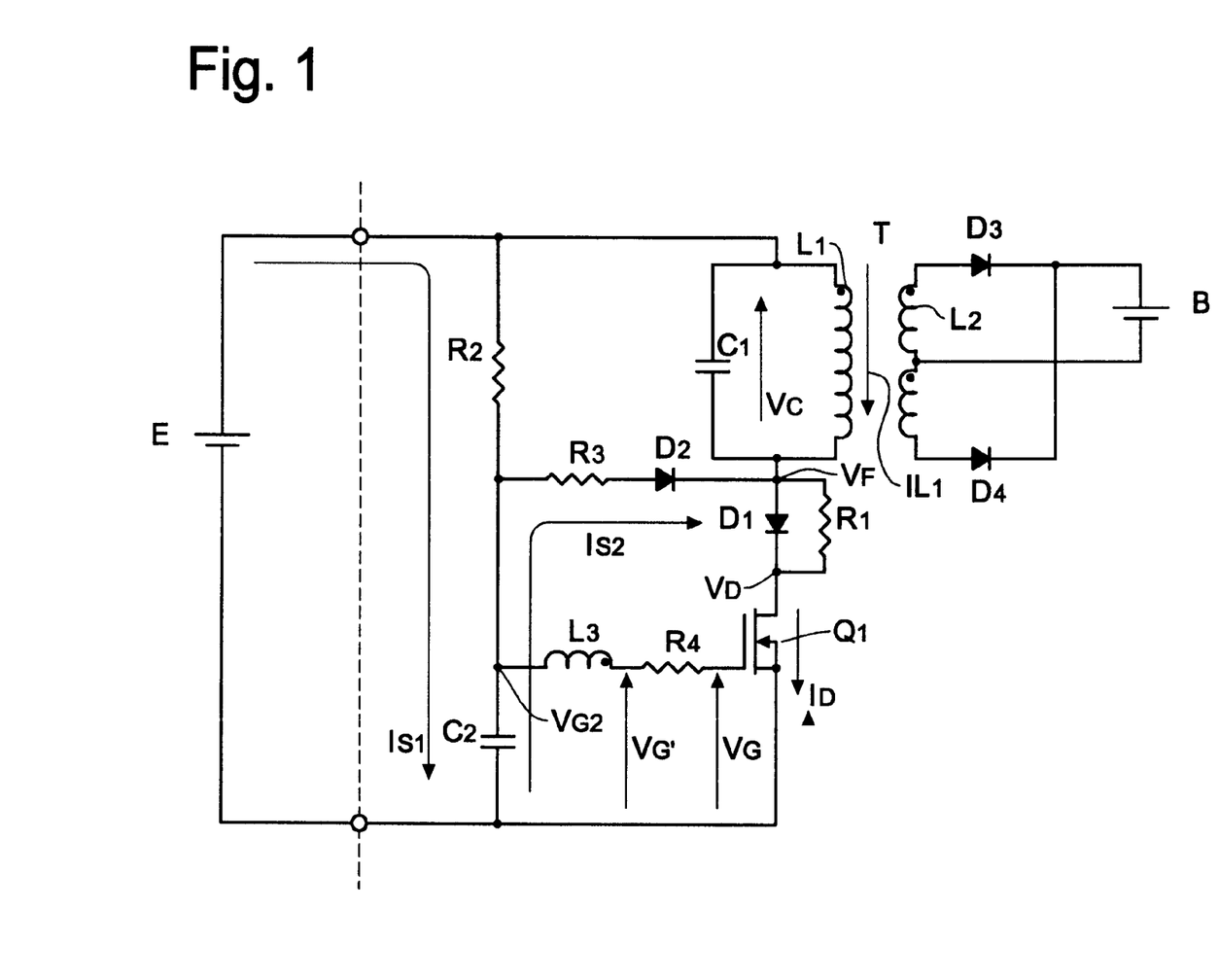
FIG. 1 is a circuit diagram showing a first embodiment of a power supply circuit of the present invention.

A first embodiment of the power supply circuit is shown in the circuit diagram of FIG. 1. The feature of the first embodiment resides in the fact that a resistor $R_4$ is provided between the gate of the FET $Q_1$ and the feedback winding $L_3$ to reduce the switching loss. The other part of the power supply circuit is the same as that of the conventional circuit of FIG. 8. Thus, the same reference labels and numerals in FIG. 8 are used to designate the same circuit components, voltages, and currents in the circuit of FIG. 1.

The operation of the power supply circuit of FIG. 1 is explained with reference to FIGS. 2 and 3. Since the basic operation of this embodiment is the same as that of the conventional circuit of FIG. 8, only the operation of the circuit of FIG. 1 different from the conventional circuit is described below.

In FIG. 1, the resistor $R_4$ is inserted between the gate of the FET $Q_1$ and the feedback winding $L_3$. The resistor $R_4$ creates a predetermined time constant in combination with input capacitance at the gate of the FET $Q_1$. Therefore, the voltage $V_G$ supplied to the gate (shown by the solid line of FIG. 2D or the solid line of FIG. 3C) is delayed from the feedback voltage $V_G'$ of the feedback winding $L_3$. In other words, the voltage $V_G$ at the gate of the FET $Q_1$ is delayed relative to the drain voltage $V_D$ as shown by the dotted line of FIG. 2D or the solid line of FIG. 3C. Accordingly, the drain current $I_D$ (shown in FIG. 2C or by the dotted line of FIG. 3D) will not flow with respect to the drain voltage $V_D$ (shown in FIG. 2B or 3B) before reaching zero volt. As a consequence, the switching loss is substantially reduced.

Figure 2A:
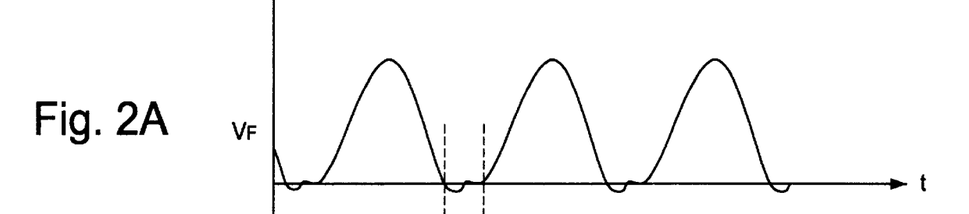
FIGS. 2A–2D are waveform diagrams showing an operation of the power supply circuit of FIG. 1.
Figure 2B:
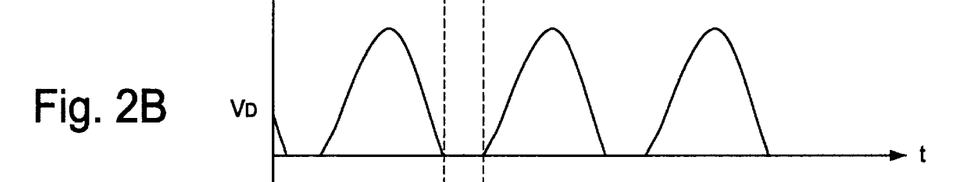
Figure 2C:
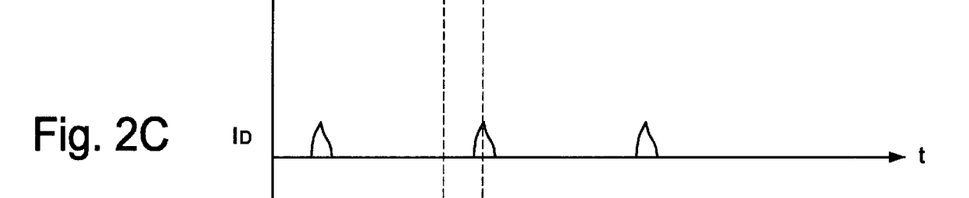
Figure 2D:
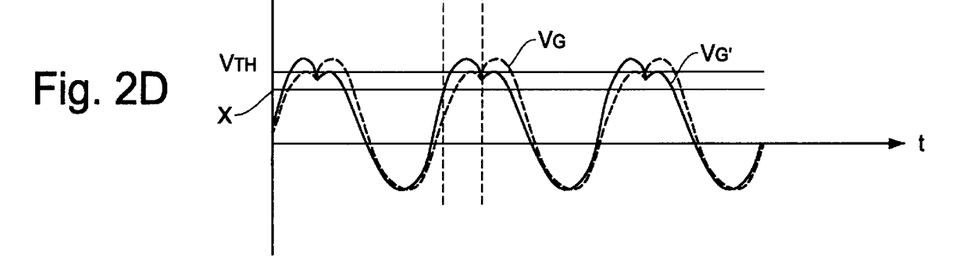
Figure 3A:
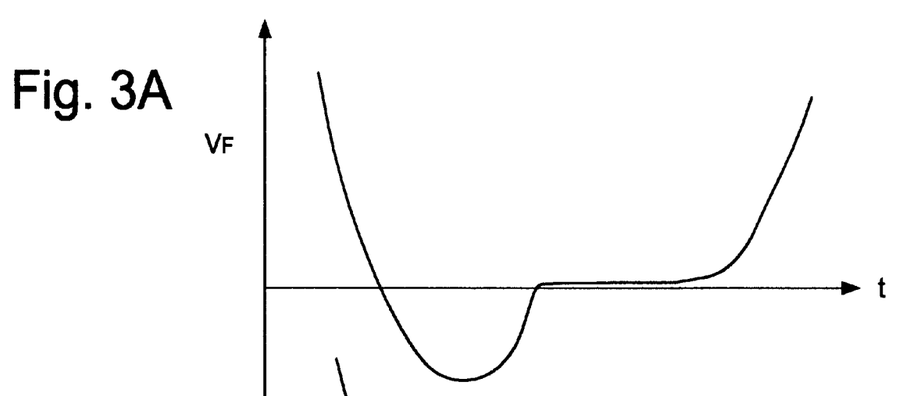
FIGS. 3A–3D are waveform diagrams showing an operation of a third embodiment of a power supply circuit of the present invention.
Figure 3B:
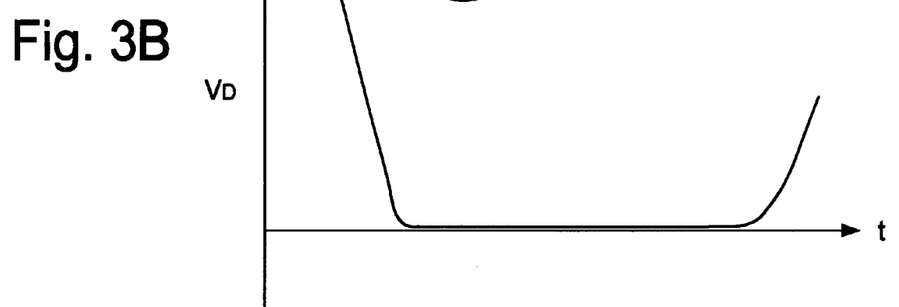
Figure 3C:
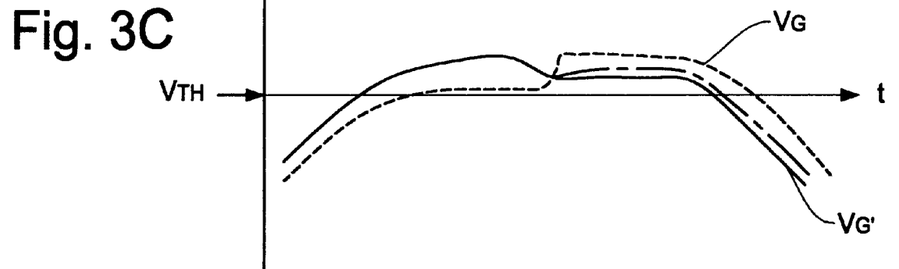
Figure 3D:
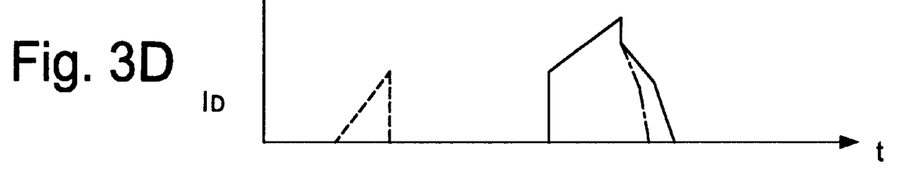

In FIG. 3C, a flat portion of the gate voltage $V_G$ results from a Miller effect at the gate of the FET $Q_1$. The waveforms in FIGS. 2A and 3A represent the voltage $V_F$ at the connection point of the LC resonance circuit formed by the capacitor $C_1$ and the primary winding $L_1$ and the other parallel circuit formed by the diode $D_1$ and the resistor $R_1$. In FIG. 2D, the line X represents the threshold voltage at the gate of the FET $Q_1$. Similarly, in FIG. 3C, $V_{TH}$ represents the threshold voltage at the gate of the FET $Q_1$.

Figure 4:
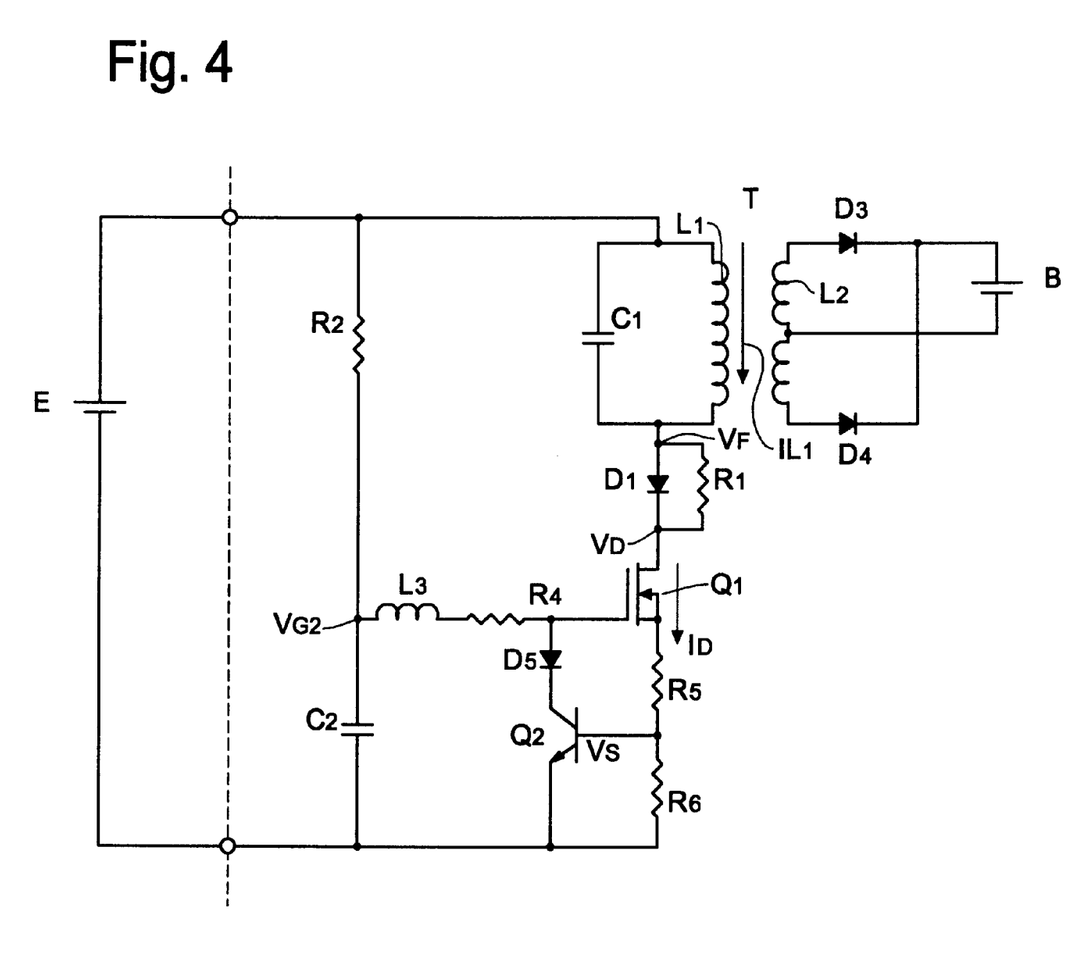
FIG. 4 is a circuit diagram showing a second embodiment of a power supply circuit of the present invention.

A second embodiment of the present invention is shown in FIG. 4, wherein the bias control circuit in the first embodiment of FIG. 1 formed of the resistor $R_3$ and the diode $D_2$ is replaced by a bias control circuit of different circuit configuration. The bias control circuit in the power supply circuit of FIG. 4 includes resistors $R_5$ and $R_6$ connected in series, a diode $D_5$ and a transistor $Q_2$ connected in series.

The series circuit of the resistors $R_5$ and $R_6$ is connected to the source of the FET $Q_1$ to provide a bias voltage to the base of the transistor $Q_2$. The series circuit of the diode $D_5$ and the transistor $Q_2$ is connected to the gate of the FET $Q_1$. The other parts of the power supply circuit are the same as that of the embodiment of FIG. 1. Thus, the reference labels and numerals used in FIG. 1 are used to designate the same circuit components, voltages, and currents in the circuit of FIG. 4.

The operation of the power supply circuit of FIG. 4 is explained below. Since the basic operation of this embodiment is generally the same as that of the conventional circuit of FIG. 1, only the operation different from the conventional circuit is described.

In FIG. 4, when a voltage at the connection point of the resistors $R_5$ and $R_6$ increases with the increase of the current $I_D$ flowing through the FET $Q_1$, and reaches a predetermined level, the transistor $Q_2$ becomes active. Accordingly, the capacitor $C_2$ discharges through a discharge path formed of the feedback winding $L_3$, the resistor $R_4$, the diode $D_5$, the transistor $Q_2$, and the capacitor $C_2$, thereby controlling the FET bias voltage $V_{G2}$ in a manner to limit the drain current $I_D$. The values of resistance in the resistors $R_5$ and $R_6$ are selected to balance the charge and discharge in the capacitor $C_2$. Similar to the first embodiment, the resistor $R_4$, in combination with the input capacitance of the FET $Q_1$, functions to reduce the switching loss in the FET $Q_1$ by delaying the gate voltage relative to the feedback voltage as noted above.

Figure 5:
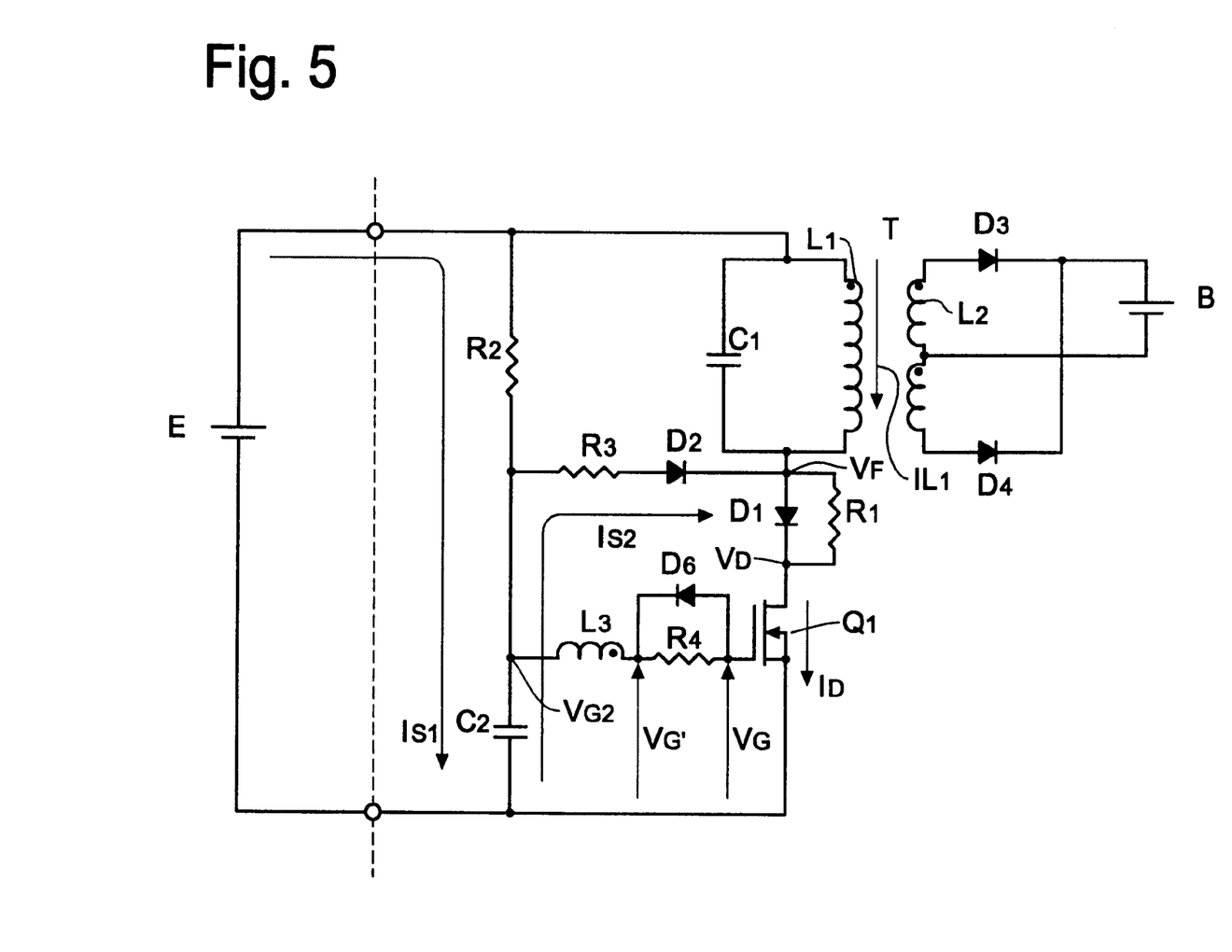
FIG. 5 is a circuit diagram showing the third embodiment of the power supply circuit of the present invention.

The third embodiment of the present invention is shown in FIG. 5, wherein a diode $D_6$ is connected in parallel with the resistor $R_4$. As noted above, the resistor $R_4$ functions to reduce the switching loss in the FET $Q_1$ by delaying the gate voltage relative to the drain voltage $V_D$. The other parts of the power supply circuit of FIG. 5 are the same as that of the first embodiment of FIG. 1. Thus, the reference labels and numerals in FIG. 1 are used to designate the corresponding circuit components, voltages, and currents in the circuit of FIG. 5.

In the example of FIG. 5, the switching loss is further reduced from the first embodiment described above by incorporating the parallel diode $D_6$ at the gate of the FET $Q_1$. In the first embodiment, the resistor $R_4$ is effective to minimize the switching loss involved in the ON state of the FET $Q_1$. However, the switching loss in the first embodiment may increase in the OFF state since the transition of the FET $Q_1$ for going OFF will be delayed by the gate voltage $V_G$ because of the resistor $R_4$.

In FIG. 5, the diode $D_6$ is connected in parallel with the resistor $R_4$, and thus the gate voltage $V_G$ is limited by the diode threshold voltage as shown by the phantom line of FIG. 3C. The gate voltage $V_G$ thus goes down to reach the threshold voltage $V_{TH}$ of the FET $Q_1$ earlier than the gate voltage without the diode $D_6$ shown by the dotted line of FIG. 3C. Consequently, the drain current $I_D$ quickly goes to zero as shown by the phantom line of FIG. 3D, thereby decreasing the switching loss in the OFF state of the FET $Q_1$.

Figure 6:
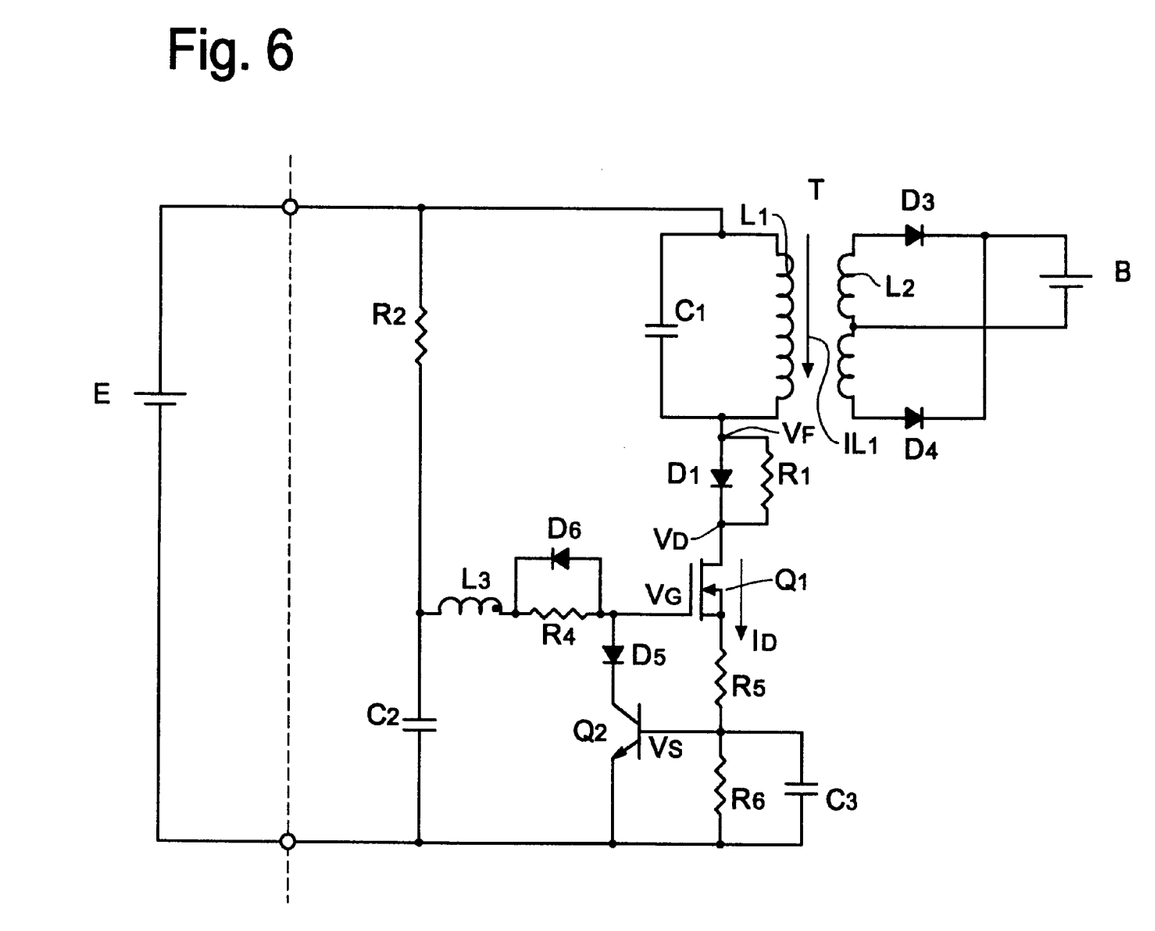
FIG. 6 is a circuit diagram showing a fourth embodiment of a power supply circuit of the present invention.

The fourth embodiment of the present invention is shown in FIG. 6, which is different from the second embodiment of FIG. 4 in that a capacitor $C^3$ is connected in parallel with the resistor $R_6$, and a diode $D_6$ is connected in parallel with the resistor $R_4$. The resistor $R_4$ reduces the switching loss in the FET $Q_1$ by delaying the gate voltage relative to the drain voltage as noted above. The other parts of the power supply circuit of FIG. 6 are the same as that of the second embodiment of FIG. 4. Thus, the reference labels and numerals in FIG. 4 are used to designate the corresponding circuit components, voltages, and currents of FIG. 6.

In the example of FIG. 4, because the resistors $R_5$ and $R_6$ are connected to the source of the FET $Q_1$, when the current flowing through the FET $Q_1$ reaches a predetermined level the transistor $Q_2$ for the bias control of the FET $Q_1$ becomes active. This promotes discharge in the capacitor $C_2$ through the discharge path formed with the feedback winding L3, the resistor $R_4$, the diode $D_5$ and the transistor $Q_2$, thereby quickly bringing the FET $Q_1$ to OFF to limit the drain current $I_D$. However, during the transition of the FET $Q_1$ to OFF, because of the reduced current in the FET $Q_1$ in the transient period, the base voltage $V_S$ of the transistor $Q_2$ goes down, resulting in the reduction of the discharge in the capacitor $C_2$. In other words, when the gate voltage $V_G$ decreases, the threshold voltage of the FET $Q_1$ also decreases in a manner to prevent the FET $Q_1$ from going OFF. Consequently, the drain current $I_D$ decreases slowly as shown by a dotted line of FIG. 7B, causing switching loss.

Figure 7A:
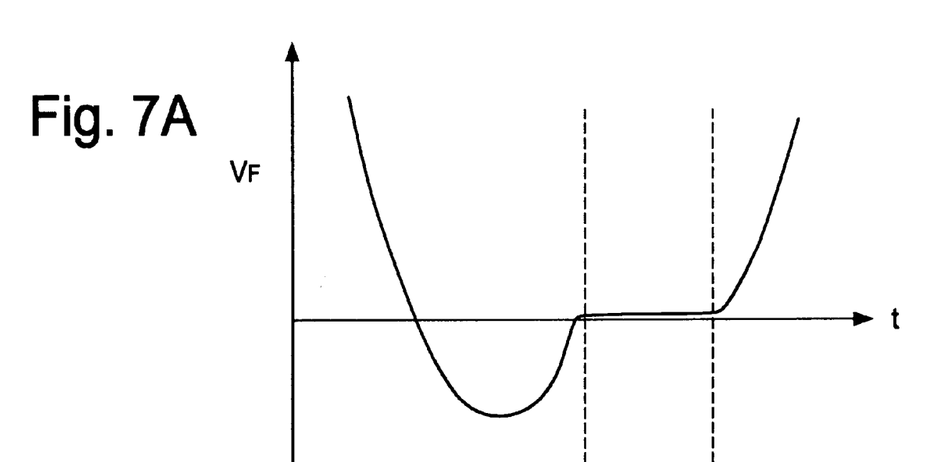
FIGS. 7A and 7B are waveform diagrams showing an operation of the circuit of FIG. 6.
Figure 7B:
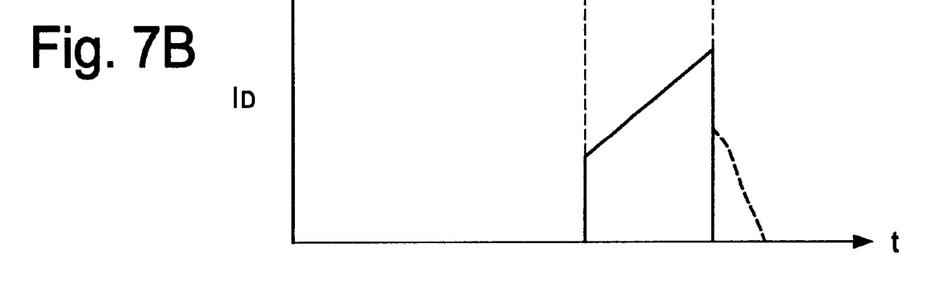

In the embodiment of FIG. 6, because of the capacitor $C_3$ connected in parallel with the resistor $R_6$, the reduction in the base voltage $V_S$ of the transistor $Q_2$ is delayed, thereby maintaining the transistor $Q_2$ active during the delayed period. Thus, the FET $Q_1$ goes to OFF quickly because the threshold voltage thereof will not decrease during this period. Consequently, the drain current $I_D$ immediately decreases as shown by a solid line of FIG. 7B, which decreases the switching loss involved in the example of FIG. 4. FIG. 7A shows a voltage $V_F$ at the connection point of the resonance circuit formed with $C_1$ and $L_1$ and the diode $D_1$.

In the foregoing embodiments, the power supply circuit utilizes the DC voltage E. However, other voltage sources such as a voltage produced by rectifying and smoothing a commercial power source can also be used. Further, instead of the FET, other switching elements such as IGBT (Insulated Gate Bipolar Transistor) can also be used.

In the first embodiment of the present invention, a power supply circuit includes a switching element provided with a control terminal for changing between an ON state and an OFF state, an LC resonant circuit connected to the switching element and has a predetermined resonant frequency, a resistor connected to the control terminal of the switching element, a feedback winding for applying a feedback voltage derived from a high frequency signal across the LC resonant circuit to the control terminal through the resistor, and a bias circuit connected to the feedback winding for providing a bias voltage superimposed with the feedback voltage to the control terminal through the feedback winding and the resistor for alternately switching between the ON and Off states. The feedback voltage is delayed by a time defined by the resistor before being applied to the control terminal of the switching element.

According to the first embodiment of the present invention, the feedback voltage supplied to the control terminal is delayed when it is applied to the switching element because of the resistor connected to the control terminal. Thus, a current flowing through the switching element is also delayed, which serves to decrease switching loss in the switching element.

In the second embodiment of the present invention, in addition to the arrangement of the first embodiment, a diode is provided in parallel with the resistor at the control terminal of the switching element. According to this aspect of the present invention, since the diode limits the feedback voltage applied to the control terminal, the feedback signal quickly decreases below the threshold level of the switching element. Therefore, the current in the switching element immediately decreases, which further serves to decrease the switching loss.

In the further aspect of the present invention, in addition to the arrangement of the first embodiment, the power supply circuit includes a transistor whose base bias voltage is controlled by a current flowing through the switching element and whose collector is connected to the control terminal in such a way to decrease a bias voltage at the control terminal of the switching element. According to this embodiment, when the current in the switching element increases to a degree to make the transistor ON, the bias voltage for the control terminal decreases. Therefore, the transistor functions to limit the current flowing through the switching element, which decreases the switching loss.

In the further aspect of the present invention, in addition to the arrangement of the first embodiment, the power supply circuit includes a transistor and a capacitor. The base bias voltage of the transistor is controlled by a current flowing through the switching element and the collector of the transistor is connected to the control terminal in such a way to decrease a bias voltage at the control terminal of the switching element. The capacitor is connected to the base of the transistor to delay the voltage change thereof. According to this embodiment, since the transistor is delayed its transition to change from the ON state to the OFF state, the transition of the switching element changing from the ON state to the OFF state is achieved at high speed in response to the change of said feedback voltage, which serves to decrease the switching loss.

What is claimed is:
1. A power supply circuit, comprising:
   a voltage driven type switching element having a control terminal for repeatedly changing between an ON state and an OFF state;
   an LC resonant circuit connected to said switching element and has a predetermined resonant frequency;

a delay resistor directly connected to said control terminal of said switching element;

a feedback winding for applying a feedback voltage derived from a high frequency signal across said LC resonant circuit to said control terminal through said delay resistor, said feedback voltage being delayed by said delay resistor before being applied to said control terminal; and a bias circuit connected to said feedback winding for providing a bias voltage to said control terminal through said feedback winding and said resistor for alternately switching between said ON and Off states in combination with said feedback voltage;

wherein said voltage driven type switching element has an input impedance sufficiently higher than a source impedance of said feedback voltage in such a way that substantially no current flows into said control terminal of said switching element by said feedback voltage, and wherein said feedback voltage is delayed by a time defined by said delay resistor and an input capacitor of said switching element before being applied to said control terminal.

2. A power supply circuit as defined in claim 1, further comprising a diode connected in parallel with said delay resistor.

3. A power supply circuit as defined in claim 1, further comprising a transistor whose base bias voltage is controlled by a current flowing through said switching element and whose collector is connected to said control terminal in such a way to decrease a bias voltage at said control terminal of said switching element when said transistor is in an ON state.

4. A power supply circuit as defined in claim 3, further comprising a capacitor for delaying said base bias voltage of said transistor in such a way to delay transition of said transistor changing to an OFF state so that a current in said switching element quickly decreases in response to the change of said feedback voltage.

5. A power supply circuit as defined in claim 4, wherein said switching element is a FET (field effect transistor) and said control terminal of said switching element is a gate of said FET wherein said bias voltage of said transistor is produced by a pair of resistors series connected to a source of said FET.

6. A power supply circuit as defined in claim 5, wherein a second diode is connected between said collector of said transistor and said gate of said FET.

7. A power supply circuit as defined in claim 6, wherein said bias circuit includes a bias capacitor which is charged by a DC (direct current) voltage source and discharged through a discharge path formed with said delay resistor, said second diode, and said transistor.

8. A power supply circuit as defined in claim 1, wherein said bias circuit includes a bias capacitor which is charged by a DC (direct current) voltage source and discharged through a discharge path.

9. A power supply circuit as defined in claim 1, wherein said LC resonant circuit includes a transformer having a primary winding and a secondary winding where said primary winding serves as inductance of said LC resonant circuit and said secondary winding supplies an output voltage to a load.

10. A power supply circuit as defined in claim 1, wherein said switching element is a FET (field effect transistor) and said control terminal of said switching element is a gate of said FET.

11. A power supply circuit for driving an electrical device, comprising:

a DC supply providing a DC voltage;

a transformer having a primary winding, a secondary winding and a feedback winding:

a self-excited oscillator comprising a FET transistor which is connected in series with said primary winding across said DC supply and energized by said DC supply to generate a high frequency voltage across said primary winding, a high frequency feedback voltage across said feedback winding and a resulting output AC voltage across said secondary winding, said output AC voltage being applied to a load circuit of said device;

a bias capacitor connected in series with said feedback winding across a gate-source path of said FET transistor for providing an offset voltage which is additive to said high frequency feedback voltage developed across said feedback winding to give a bias voltage to a gate of said FET transistor so as to alternately turn on and off said FET transistor for driving said self-excited oscillator;

a delay resistor connected between said feedback winding and said gate of said FET transistor for delaying said bias voltage induced in said feedback winding before being supplied to said gate by a time constant defined by said delay resistor and an input capacitor of said FET transistor, and said FET transistor having an input impedance sufficiently higher than a source impedance of said bias voltage so that substantially no current flows into said gate by said bias voltage;

a transistor connected to said gate of said FET transistor to establish a discharge path for said bias capacitor, said transistor being turned on when a current flowing through said FET transistor exceeds a predetermined amount; and a delay capacitor for delaying said transistor to turn off when said current flowing through said FET transistor decreases.

* * * * *